United States Patent [19]

Leis

[11] Patent Number: 4,911,138
[45] Date of Patent: Mar. 27, 1990

[54] APPARATUS FOR PRODUCING COMPOSITE PANELS

[76] Inventor: Rudolf Leis, Haus Nr. 128a, A-5421 Adnet, Austria

[21] Appl. No.: 351,197

[22] Filed: May 12, 1989

Related U.S. Application Data

[62] Division of Ser. No. 70,949, Jul. 8, 1987, Pat. No. 4,855,177.

[30] Foreign Application Priority Data

Jul. 8, 1986 [AT] Austria ............................. 1841/86
Aug. 26, 1986 [AT] Austria ............................. 933/87
Feb. 6, 1987 [AT] Austria ............................. 243/87

[51] Int. Cl.$^4$ ............................................. B28D 1/06
[52] U.S. Cl. ..................................... 125/16 R; 125/35; 51/217 R; 269/246; 269/264
[58] Field of Search ............. 125/16 R, 35; 51/217 A, 51/217 R, 240 R, 92 R; 269/58, 74, 81, 246, 264

[56] References Cited

U.S. PATENT DOCUMENTS

| | | | |
|---|---|---|---|
| 1,007,540 | 10/1911 | Cross ..................................... | 125/35 |
| 3,089,478 | 5/1963 | Jones ..................................... | 125/35 |
| 3,993,822 | 11/1976 | Knauf et al. ......................... | 428/213 |
| 4,159,361 | 6/1979 | Schupack ............................. | 428/240 |
| 4,378,405 | 3/1983 | Pilgrim ............................... | 428/322.7 |
| 4,617,219 | 10/1986 | Schupack ........................... | 428/113 |
| 4,619,857 | 10/1986 | Gmur ................................. | 428/186 |
| 4,634,626 | 1/1987 | Yamaguchi et al. ............. | 428/312.4 |

Primary Examiner—Frederick R. Schmidt
Assistant Examiner—M. Rachuba
Attorney, Agent, or Firm—Lorusso & Loud

[57] ABSTRACT

A composite panel consists of a natural stone layer (1) and a reinforcing layer (13) that has a fibre layer (2) embedded in synthetic resin, and at least one layer (3) of synthetic resin. The fibre layer (2) serves as tensile reinforcement and the layer (3) of synthetic resin serves as compression reinforcement for the natural stone layer (1), so that the composite panel can absorb both positive and negative bending moments. The synthetic resin layer (3) is reinforced, for example, with a fine-mesh glass fibre textile (6) that faces towards the tensile reinforcing fibre layer (2) and an adjacent glass fibre mat (8). In order to produce the composite panels, natural stone panels that have been cut to a greater thickness are coated on both sides with the reinforcing layer (13). A plurality of coated natural stone panels are then arranged so as to be equally spaced on their center planes, and then simultaneously divided.

2 Claims, 3 Drawing Sheets

APPARATUS FOR PRODUCING COMPOSITE PANELS

This is a divisional of co-pending application Ser. No. 070,949 filed on 7/8/87 now U.S. Pat. No. 4,855,177, issued Aug. 8, 1989.

The present invention relates to a composite panel with a natural stone layer, which has an exposed finished surface and a rear side, and with a reinforcing layer, as well as a process and an apparatus for the production of such panel.

A composite panel of this type intended for use as a base panel or as a trim panel is described, for example, in DE-A-34 15 779. This is a natural stone panel with a rear tensile reinforcement layer, that consists of bands, in particular of carbon fibres, embedded in the plastic and extending in the direction of tension, the panel being intended for installation in a bed of mortar or gravel. Naturally, the tensile reinforcement is able to absorb positive loading moments resulting from a concave bending of the natural stone panel. although it cannot cope with negative loading moments. Since it is impossible to preclude a central mounting of the bedding material when the panel is laid in the foundation, fracture of the natural stone panel brought about by negative loading moments can be prevented in that an elastic and compressible displacement layer, of something in the nature of soft foam material, is installed in the centre area so as to leave edge supporting strips free, which means that the panel is supported exclusively in the peripheral area.

On the other hand, glass fibre reinforced plastic layers for tensile and compression reinforcement and used as intermediate layers for a plurality of wood chip panels for stairs, platforms, etc. are described in DE-A-23 64 321.

Unless special aids are used, only minimal panel thicknesses of approximately 18 to 20 mm can be obtained during the production of natural stone panels, the panels being cut from full blocks by means of saw frames. Panels that are thinner break because of the vibration generated by the saw, since these vibrations generate both tensile and compressive forces. In addition, natural stone panels are relatively heavy, so that it becomes difficult to handle them carefully and this in turn increases the risk of breakage. As a consequence, it has been shown that light stone panels can be produced if the natural stone constitutes only one layer in a composite panel, with the second layer consisting of a light carrier material. A process of this type is described in DE-A21 29 057. Here, the panels that are cut from full blocks are placed in a form and a plastic layer is foamed onto them, which then reinforces the natural stone so that subsequent division without damaging the stone becomes possible. This process can, if necessary, be repeated, so that natural stone layers of 1 to 2 mm can be obtained.

Because of the ever decreasing thickness of the layers, the halving cuts must be made very precisely. It is clear that when producing layers that are 1 to 2 mm thick, even the slightest deviations in the plane of the cut will destroy the natural stone layer. Natural stone panels of this kind must thus be cut individually, with the result that the multi-blade saw frames normally used for producing stone panels cannot be used. Since even minimal errors in thickness can be compounded when a plurality of plastic panels that are foamed on both sides are arranged adjacent to each other, it is quite possible that in something like a packet of 10 panels, after the fourth panel the halving cuts will be adjacent to the natural stone layer.

A further process is described in DE-A-28 33 874. This does not involve the problem of precise positioning of the plane of the cut. In a natural stone block, cuts are made at a greater distance from each other by means of a multi-blade saw frame, and a connecting piece is left on the supported side. The resulting gaps are filled at least partially with expanding plastics or some other material. The block is then moved and a second cut is made to its total height. This results in a composite panel with two outside natural stone layers connected to each other by means of a connecting piece, and the centre filler layer. Now, each other side is coated with a reinforcing layer, such as a glass fibre reinforced plastic layer, the connecting piece is cut off, and the five layer composite panel is separated along the centre plastic layer. After cleaning, grinding, and polishing of the exposed natural stone layers, there are similarly two layer composite panels with, for example, a 5-mm thick natural stone layer. In a variation of this, prior to the first cut being made in the natural stone block, the latter is provided with an additional connecting piece (of concrete, for example) so that the first cut can be made over the whole height of the natural stone block, and prior to the removal of the saw blades, wedges are inserted into the cuts in order that there is no change in the distances to the filling. Taken all in all, this process is relatively time-consuming and labour-intensive, since the later exposed finished surface of each composite panel must be made by the first cut and a second pouring must be completed for the completion of the second cut and ultimately this has to be cut once again.

Thus, the aim of the present invention is to create a composite panel of the type described in the introduction hereto, which, being as thin as possible, can be sawn and used as a plane, static, non-supporting large-area trim panel. A further aim of the present invention is to develop a process by which the separating cuts in a packet of natural stone panels that are coated on both sides do, in point of fact, halve these.

The invention provides a composite panel comprising a natural stone layer which has an exposed finished surface and a back surface, and having a reinforcing coating which has a fibre layer bonded to the back of the natural stone layer and which absorbs tensile forces from concave bending of the exposed finished surface, and at least one layer of plastic resin that absorbs compression forces resulting from convex resin bending of the exposed finished surface, and plastic resin layer being arranged on the side of the fibre layer that is remote from the natural stone layer.

A composite body as in the present invention thus provides not only the known tensile reinforcement, but also compression protection, so that vibrational forces that act perpendicularly to the plane of the cut in both directions can be absorbed without damage to the marble panel. This means that it is possible to obtain a very thin marble layer, which after the necessary grinding of the sawn faces is preferably less than 3 mm thick.

In a preferred embodiment, it is foreseen that the compression protective layer of plastic resin is provided with reinforcements that consist of a fine-mesh glass fibre textile that faces the tensile reinforcement fibre layer, and of an adjacent glass fibre mat. Because of the reinforcement by the compression protection, the overall thickness of the plastic layer can be kept very thin. The compression protecting fibre layer preferably consists of a glass fibre mat.

The invention also provides a process for producing composite panels that consist of a thin natural stone layer and a reinforcing layer, wherein first thicker natural stone panels are each coated on both sides with the reinforcing layer, and then a plurality of thus coated natural stone panels are arranged adjacent to each other so as to be equally spaced on their centre planes, and finally are cut simultaneously each into two composite panels both of which are coated on one side.

A known multi-blade saw frame can be used advantageously for cutting the thicker natural stone panel, i.e., a natural stone block is sawn into a plurality of natural stone panels simultaneously and in the usual manner. The natural stone panels are then dried and after drying are coated on both sides with the reinforcing layer. It is preferred that glass fibres embedded in plastic resin be used for this purpose, and these form compression and tensile reinforcement, if a first layer in the form of a glass fibre mat is applied to the natural stone, followed by a second layer in the form of a fine mesh glass fibre textile, and finally a third layer consisting of a glass fibre mat. The thickness of these multi-layer coatings amounts to approximately 2 mm. The natural stone panels so coated are then combined into packets or bundles and so placed on the block carrier of the multi-blade saw frame that the saw blades lie on the centre planes of the natural stone panels. Alignment is effected preferably by means of spacers and the cavities formed betwen these are filled, at least partially, with a filler material. The cuts are then made, and these generate the exposed finished surfaces of the composite panel. Any mortars containing inorganic or organic bonding agents are suitable as filler material, an important advantage vis-a-vis the abovedescribed process according to DE-A-28 33 874 lies in the fact that only the coated side comes into contact with the filler material so that there is no need to remove filler material from the exposed finished surface of the natural stone. Since the bonding between the filler material and the reinforcing layer is very slight in the normal course of events, this is released when the composite panel is removed from the packet.

A preferred system for producing composite panels of this type, which comprises a multi-blade saw frame and a block carrier, provides for the block carrier a tipping platform. In the preferably four rows the coated natural stone panels to be cut (which extend perpendicularly to the axis of tilt) there is in each instance a spacer. On the side of the tilt axis there is a fixed side support and opposite this an adjustable side support.

For purposes of loading the block carrier with the coated natural stone panels, the platform of the block carrier is tilted obliquely so that the natural stone panels rest on one side against the spacers which are preferably adjustable along rails. The adjustable side support is slid against the last panel in the packet and the platform is then swung down to the horizontal position. Once the cavities have been filled, the halving cuts are made in the desired positions, since thickness inaccuracies from the first cut and from the coating are not added together. The individually adjustable spaces make it possible to adjust the centre planes of even very thin panels individually on the planes of the cut.

The invention will further be described in greater detail below, by way of example only, with reference to the drawings appended hereto, without necessarily being restricted to these. In the drawings.

Figure 1:
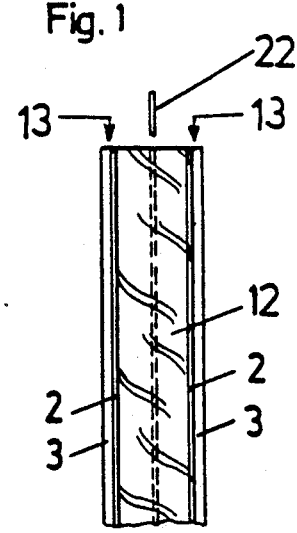
FIG. 1 is a side view of a double sided coated natural stone panel prior to the separating cut.
Figure 3:
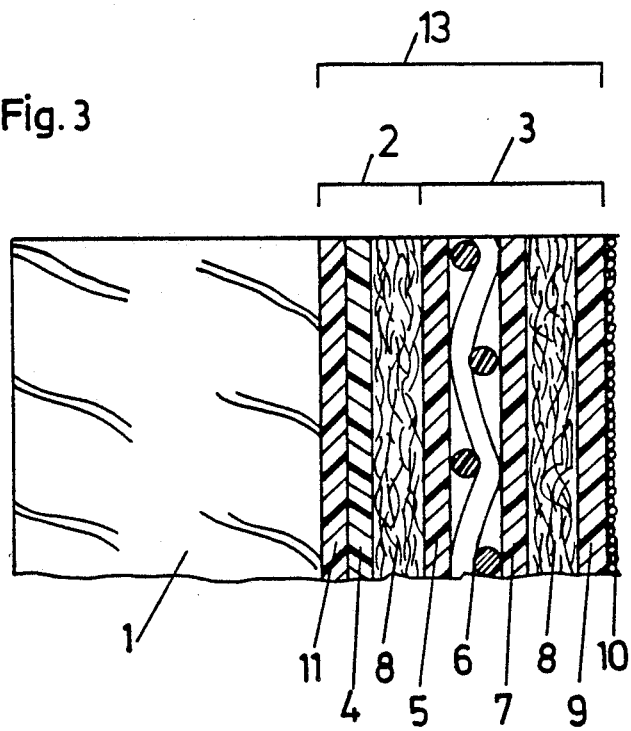
FIG. 3 is an enlarged fragmentary view showing the bluid-up of the layers in detail.
Figure 4:
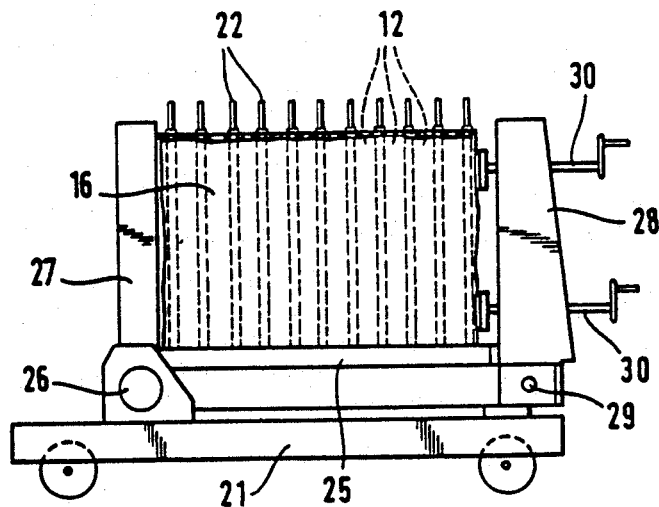
FIG. 4 shows a natural stone block prior to the first cut.

A block 16 of natural stone, in particular, marble, is sawn into natural stone panels 12 in a multi-blade saw frame; the thickness of these panels shall not be less than a specific thickness, approximately 18 to 20 mm. In order to make the first cut (FIG. 4), the block 16 is arranged in a block carrier 21 and fixed between two side supports 27, 28; of these, one has an adjustable holding system 30. The individual natural stone panels 12 (FIG. 1) are dried in a drying chamber at approximately 100° C. and the cut surfaces are provided with a reinforcing layer 13. The reinforcing layer 13 consists, as is shown in FIG. 3, of a tensile reinforcing fibre layer 2 that is connected by means of an epoxy resin layer 11 as an adhesive bridge to the natural stone layer 1, and an adjacent layer 3 which is in its turn made up of a plurality of layers. The fibre layer 2 has an epoxy resin layer 4 as a bedding mass for a glass fibre mat 8 that serves as tensile reinforcement, which is preferably of a weight of 350 g/m$^2$. For installation in a fleece adhesive there can also be a final sand coating 10 having a grain size between 0.1 and 0.25 mm. This sand coating 10 is not provided if the composite panel is to be used as a cladding for a smooth surface, such as doors, furniture, or the like.

The multi-layer layer 3 consists of an epoxy resin layer 5 that is adjacent to the fibre layer 2, this serving as a bedding mass for a glass fibre textile 6, a further epoxy resin layer 7 as a bedding mass for a second fibre layer in the form of a glass fire mat 8 that weights 225 g/m$^2$, and a final epoxy resin layer 9 that can support the above-described sand coating 10. The glass fibre textile 6 and the glass fibre mat 8 form reinforcing 4 for the plastic resin layer 3 that serves as compression reinforcement for the natural stone layer 1.

Figure 2:
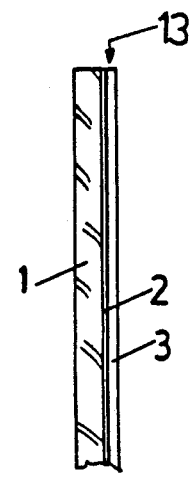
FIG. 2 shows a composite panel according to the present invention.

Returning now to FIG. 1, a natural stone panel 12 coated on both sides with a tensile reinforcing fibre layer 2 and a compression reinforcing layer 3 of plastic resin can be sawn with no problem by means of a conventional masonry store saw frame or a masonry circular saw. The original thickness of 18 mm is reduced on each side to a thickness of the natural stone layer 1 (FIG. 2) of 5 to 6 mm with due consideration being given to a saw cut or kerf width of 5 to 7 mm, and is then reduced to a thickness of 2 of 3 mm by grinding the exposed finished surface, while the tensile reinforcing and compression reinforcing absorbs the forces generated by vibration, and the risk of fracture is for all practical purposed precluded. Since the natural stone layer 1 in the composite panel accounts for some one-half the overall thickness, trim panels of approximately 4 to 5 mm thick and of an area of up to 2 m$^2$ and which possess remarkable elasticity will be produced.

Figure 5:
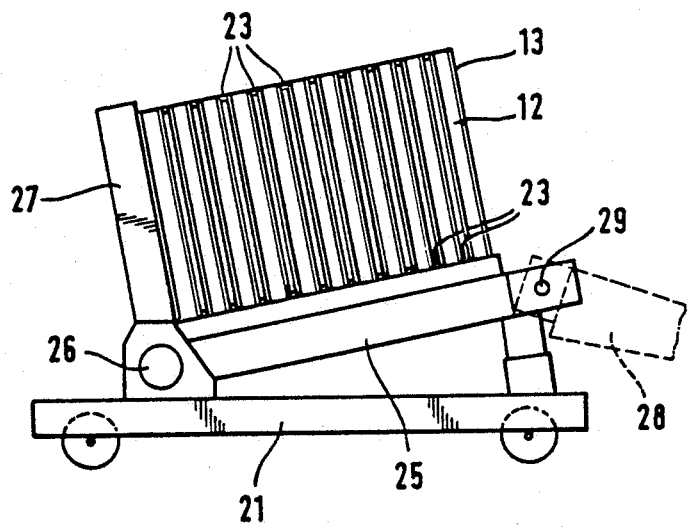
FIGS. 5 and 6 show the formation of a packet of separated natural stone panels.
Figure 6:
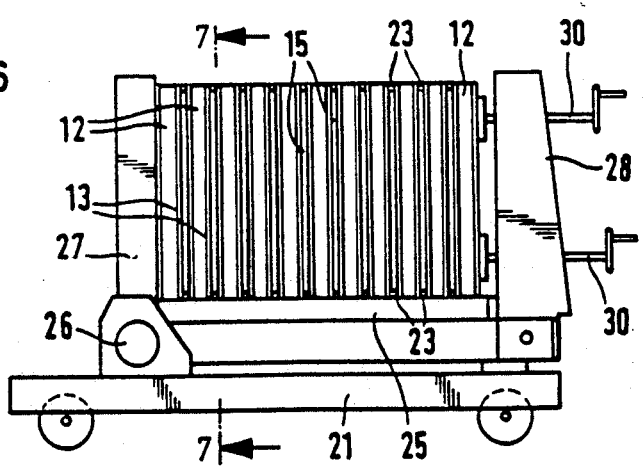
Figure 7:
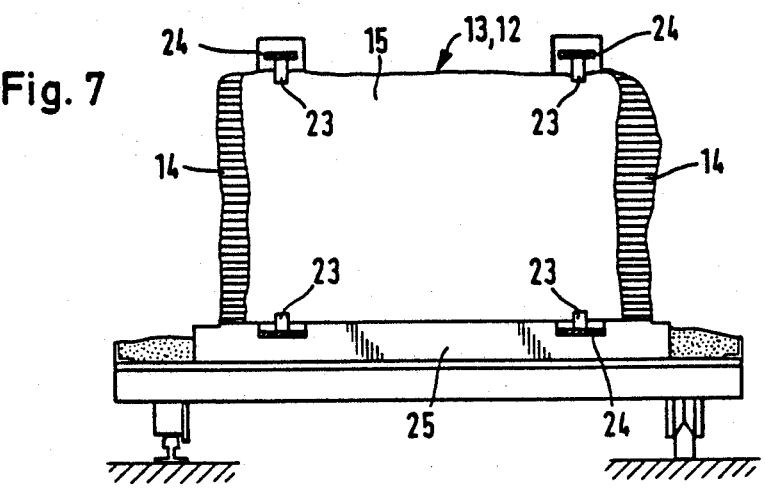
FIG. 7 is a cross section on the line VII-VII in FIG. 6.
Figure 8:
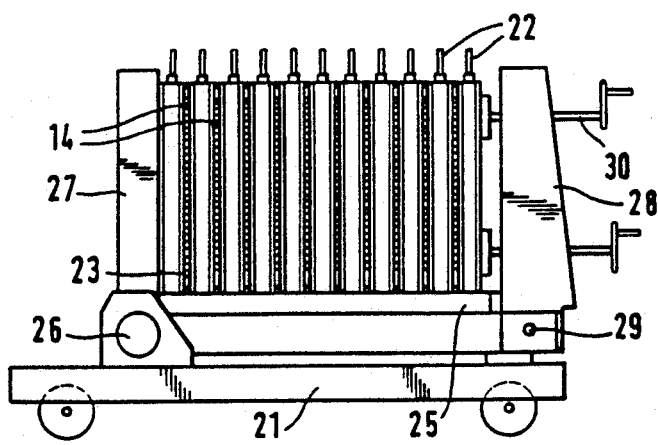
FIG. 8 shows a packet of panels prior to the second cut.

Since both the first cut as well as the reinforcing coating govern specific thickness tolerances, there is a danger of excessive displacement of the cut planes when packeting the coated panels for the second cut. In order to preclude this, there are spacers 23 provided on the block carrier 21, at least on the platform 25, and on the upper side, it is preferred that these be adjustable along rails 24 (FIG. 7). As can be seen from FIG. 5, the platform 25 of the block carrier 21 can be tilted upwards about the shaft 26, when the adjustable side support 28 can be folded down about the shaft 29. The coated natural stone panels 12 can be packeted in the carrier with the first placed against the inclined side support 27 and all the further panels placed against the spacers 23, so that each natural stone panel 12 is located in the desired position, in which (FIG. 8) one saw blade 22 of the multi-blade saw frame lies in the central plane of each natural stone panel 12. The natural stone panels 12 are preferably fixed by means of an adhesive on the platform 27, like a subpanel of stone. Thus, no accumulation of thickness errors is possible. After packeting, the adjustable side support 28 is tilted into the operating position and the platform 25 is folded down. The holding system 30 of the side support 28 is applied to the outermost natural stone panel 12, so that this is pressed against its spacer 23.

The cavities 15 between the natural stone panels 12 are at least partially filled with filler 14, for example mortar, so that after hardening a packet is ready for the second cut. It is preferred that on the platform side, the filler material 14 has a runoff gap for the water that penetrates during the cutting process. The filler material that is shown in FIG. 7 extends across the two vertical edge strips; this is sufficient for securing the natural stone panels. The reinforcing coating 13 that forms the tensile and the compression reinforcement absorbs the forces that result from the separation of the natural stone panels 12. The second cut divides each coated natural stone panel into a composite panel with a very thin natural stone layer 1 and a reinforcing coating 13.

The embodiments of the invention in which an exclusive property or privilege is claimed are defined as follows:

1. An apparatus for producing composite panels that consist of a thin natural stone layer and a reinforcing layer, said apparatus comprising: a multi-blade saw frame and a block carrier, having a tilting platform; said platform including a spacer provided for each coated natural stone panel for ensuring that the center lines of all panels being produced are equally spaced, said spacers being arranged in rows that extend perpendicularly to the axis of tilt; said platform having on the tilt axis side thereof a fixed side support and an opposing adjustable side support at the opposite side thereof.

2. The apparatus as defined in claim 1, wherein the spacers are adjustable along rails.

* * * * *